US006730877B2

(12) United States Patent
Schmidt

(10) Patent No.: US 6,730,877 B2
(45) Date of Patent: May 4, 2004

(54) WINDSHIELD WIPER HEATER

(76) Inventor: William P. Schmidt, 6288 Brancheau Rd., Newport, MI (US) 48166

( * ) Notice: Subject to any disclaimer, the term of this patent is extended or adjusted under 35 U.S.C. 154(b) by 0 days.

(21) Appl. No.: 10/171,251

(22) Filed: Jun. 12, 2002

(65) Prior Publication Data

US 2003/0057197 A1 Mar. 27, 2003

Related U.S. Application Data

(60) Provisional application No. 60/297,649, filed on Jun. 12, 2001.

(51) Int. Cl.[7] .................................................. B60L 1/02
(52) U.S. Cl. ........................ 219/203; 219/202; 219/219; 15/250.05
(58) Field of Search ................................ 219/203, 202, 219/219, 522, 543, 544; 15/250.05, 250.06, 250.07, 250.08, 250.09

(56) References Cited

U.S. PATENT DOCUMENTS 3,936,901 A * 2/1976 Theckston ............... 15/250.06
4,373,130 A * 2/1983 Krasborn et al. ........... 219/203
4,928,344 A * 5/1990 Bliss ....................... 15/250.06
4,928,345 A * 5/1990 Meltzer et al. .......... 15/250.06
5,412,177 A * 5/1995 Clark ......................... 219/203
6,028,291 A * 2/2000 Heisler ...................... 219/203
6,140,608 A * 10/2000 Stingone, Jr. .............. 219/202
6,396,026 B2 * 5/2002 Gillner et al. .............. 219/203

* cited by examiner

Primary Examiner—Henry Bennett
Assistant Examiner—Fadi H. Dahbour
(74) Attorney, Agent, or Firm—John A. Artz; Artz & Artz, P.C.

(57) ABSTRACT

A heating element or heater for use with an automotive windshield is adapted to prevent the accumulation of ice and slush on windshield wipers. The heater is defined by a laminate having an electrical resistance member sandwiched between the first and second films forming the laminate. Contacts extend out of the laminate for connection to a source of power. The electrical resistance member, preferably, comprises a resistance wire which reaches a temperature sufficient to melt snow and ice accumulating on the windshield wipers, but which is insufficient to melt the laminate or to create a fire hazard. Optimally, the heater is powered through an automotive lighter outlet or accessory power outlet disposed within the interior of the vehicle.

12 Claims, 2 Drawing Sheets

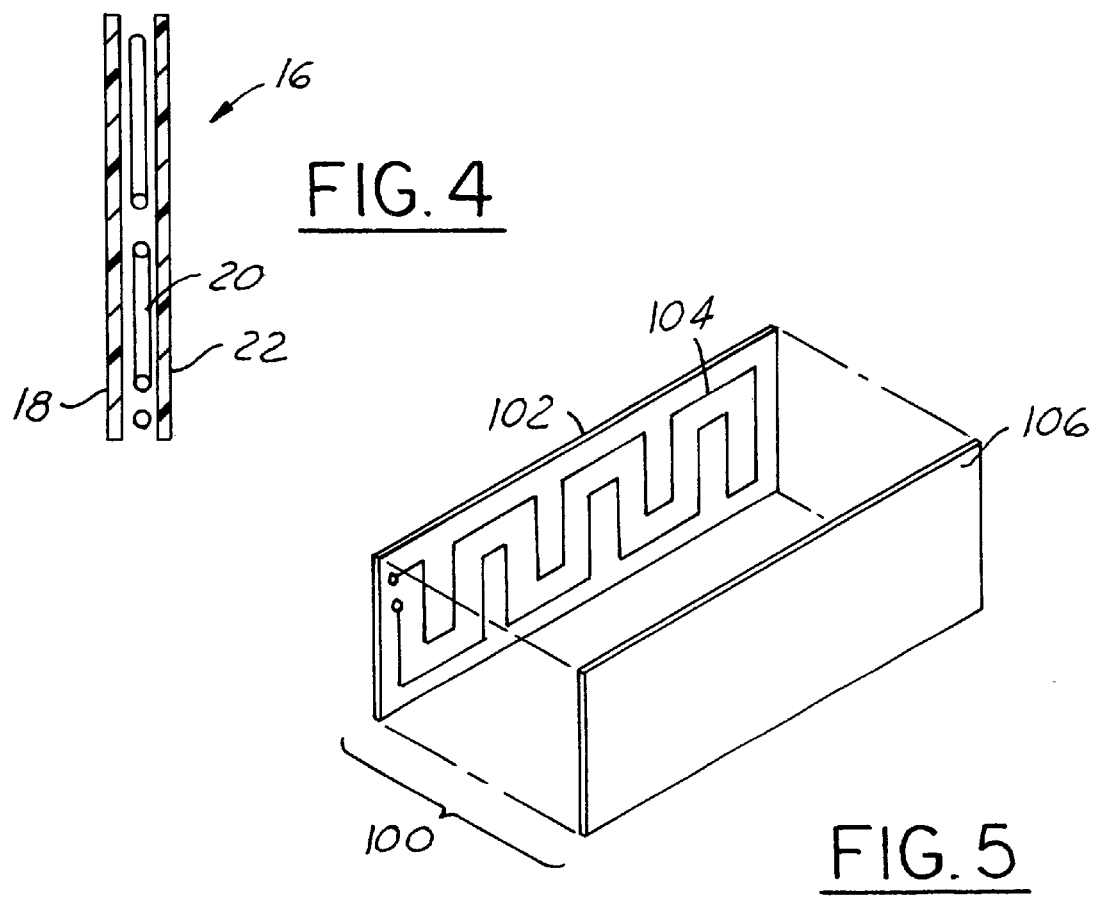

WINDSHIELD WIPER HEATER

CROSS REFERENCE TO RELATED APPLICATIONS

This application is a completion application of co-pending U.S. Provisional Patent Application Ser. No. 60/297,649, filed Jun. 12, 2001, for "WINDSHIELD WIPER HEATER", the disclosure of which is hereby incorporated by reference.

BACKGROUND OF THE INVENTION

1. Field of the Invention

The present invention concerns automotive windshield wiper heaters. More particularly, the present invention concerns heating elements for heating automotive windshield wipers. Even more particularly, the present invention concerns windshield mounted heaters for heating the windshield wipers of automotive vehicles.

2. Prior Art

As is known to those skilled in the art to which the present invention pertains during the winter months inclement weather is occasioned with precipitation such as snow, slush and the like. The snow or slush, etc. accumulates on the windshield either because of the intensity of the downfall or splatters up from the road due to other vehicles driving through it. Similarly, freezing rain accumulates on the vehicle windshield during such downpours.

Conventional automotive heaters and defrosters, while issuing heat onto the interior of the windshield distribute the heat over such a broad area or space that they do not preclude the buildup of slush and ice on the windshield wiper blade.

Simply stated, there is insufficient localized and concentrated heat directed to the windshield wiper blade to prevent the buildup of ice and/or thick slush thereon. The present invention, as will be detailed hereinafter, alleviates this situation.

SUMMARY OF THE INVENTION

In accordance with a first embodiment of the present invention there is provided a windshield wiper heater which generally comprises:

(a) a laminate, comprising:
  (1) a first film;
  (2) an electrical resistance member having first and second contacts,
  (3) a second film, the resistance member being sandwiched between the films, the contacts projecting exteriorly of the laminate;
(b) means for transmitting electrical energy to the resistance member through the contacts; and
(c) a source of power, the means for transmitting being in electrical communication with the source of power.

The present invention may further include means for removably adhering the heater to a windshield, such as an adhesive tape or the like.

The means for transmitting electrical energy may comprise either a direct contact to the vehicular battery or may be accessed through the lighter using the well-known and commercially available plunger-type plug, which is removably insertable into the lighter outlet for the vehicle or through the auxiliary power outlet, which today is, typically, provided in a vehicle.

For a more complete understanding of the present invention, reference is made to the following detailed description and accompanying drawing.

In the drawing, like reference characters refer to like parts throughout the several views in which:

BRIEF DESCRIPTION OF THE DRAWING

FIG. 4 is a cross-sectional view taken along line 4—4 of FIG. 2; and

FIG. 5 is a partial, exploded, perspective view of a second embodiment hereof.

DESCRIPTION OF THE PREFERRED EMBODIMENT

Figure 1:
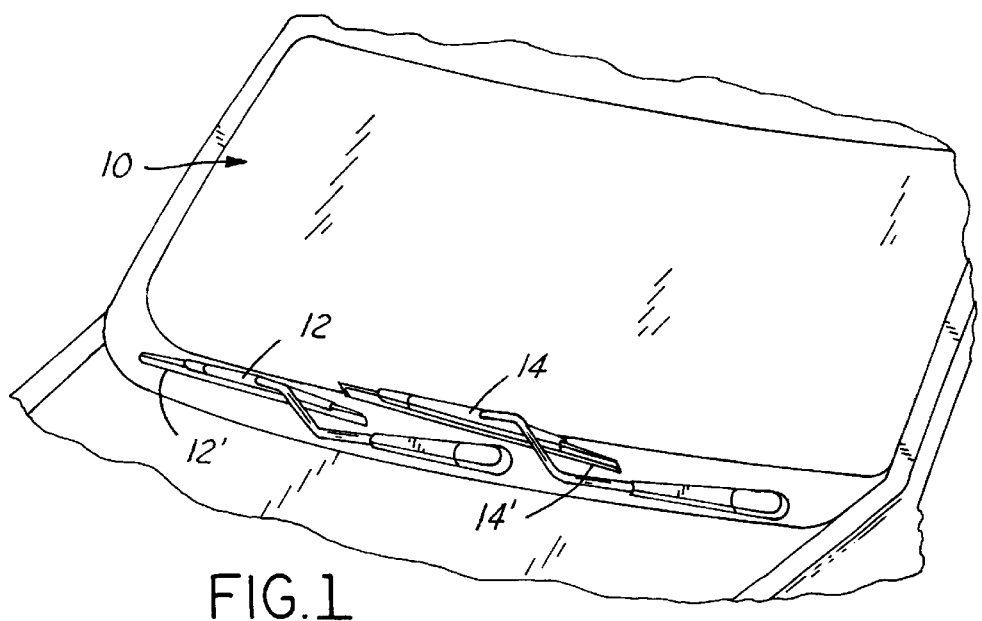
FIG. 1 is a perspective view of an automotive windshield.

As hereinabove noted, and in accordance with the present invention there is provided a windshield wiper heater which generally comprises:

(a) a laminate, comprising:
  (1) a first film;
  (2) an electrical resistance member having first and second contacts,
  (3) a second film, the resistance member being sandwiched between the films, the contacts projecting exteriorly of the laminate;
(b) means for transmitting electrical energy to the resistance member through the contacts; and
(c) a source of power, the means for transmitting being in electrical communication with the source of power.

The heating element or heater is particularly adapted for use with an automotive windshield and specifically adapted for heating the windshield wipers to prevent the accumulation of ice and slush thereon.

More particularly, and with reference to the drawing, and, in particular, FIGS. 1–4, there is depicted therein a vehicular windshield denoted at 10. The vehicle may be a car or automobile, truck, van, snowmobile or any other vehicular device which has a windshield and a windshield wiper associated therewith with the windshield wiper-bearing side of the windshield exposed to the atmosphere and the other side facing the passenger/driver side of the vehicle. For purposes of the ensuing discussion of the invention, reference will be made to an automobile.

As shown in the drawing, the windshield 10 has a pair of oscillating windshield wipers 12 and 14, associated therewith, each wiper having a windshield wiper blade 12' and 14', respectively.

As is known skilled in the art to which the invention pertains, windshield wiper motors (not shown) are operatively connected to a switch disposed within the interior or passenger compartment of the vehicle. The switch actuates the motors to rotate or oscillate the windshield wipers back and forth across the windshield in the well-known manner. Typically, the windshield wipers 12 and 14 are disposed exteriorly of the vehicle and contact the exterior side of the windshield.

Disposed within the interior or passenger compartment of the vehicle and mounted onto the windshield is a heater or heating element, generally, denoted at 16, in accordance with the present invention.

The heater, as noted above, comprises a laminate comprising a first film or layer 18 and a second film or layer 22 which are spaced apart from each other. Disposed or sandwiched between the films is an electrical resistance member such as a wire 20. The electrical resistance wire 20 is formed from any suitable material and is, typically, copper because of its conductive and resistance properties.

The copper wire conducts electricity along the extent thereof and because of the physical properties thereof creates an electrical resistance which manifests itself as heat.

Figure 2:
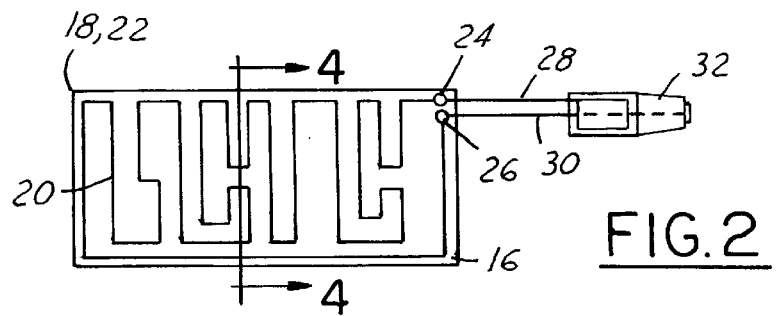
FIG. 2 is a plan view of a windshield wiper heater in accordance with the present invention.

The electrical wire 20 has a first end which defines a contact 24 and which projects outwardly from the laminate. As shown in FIG. 2, the contact 24 extends beyond the exterior of the film layers 18 and 22. Similarly, the second or opposite end of the wire 20 defines a contact 26 which, also, projects second or opposite end of the wire 20 defines a contact 26 which, also, projects outwardly from the laminate. Preferably, the two contacts are adjacent or in proximity to each other for ease of handling.

The materials of construction used for the film can be of any suitable material which is capable of transmitting heat therethrough but which will not melt under the influence of the heat generated by the copper wire. Typical materials include polysiloxanes, polycarbonates, acetates and the like. Particularly preferred is the film material sold under the name MYLAR. Regardless of the material, the two films are bonded to each other by any suitable technique including sonic welding, pressure or the like. Also, the wire 20 may be embedded within a film of material disposed above, below and therearound.

As noted, the film material selected may be any of a wide variety of commercially available materials such as silicone-based films, thin film polyethylene, thin film polypropylene, MYLAR and the like.

Figure 3:
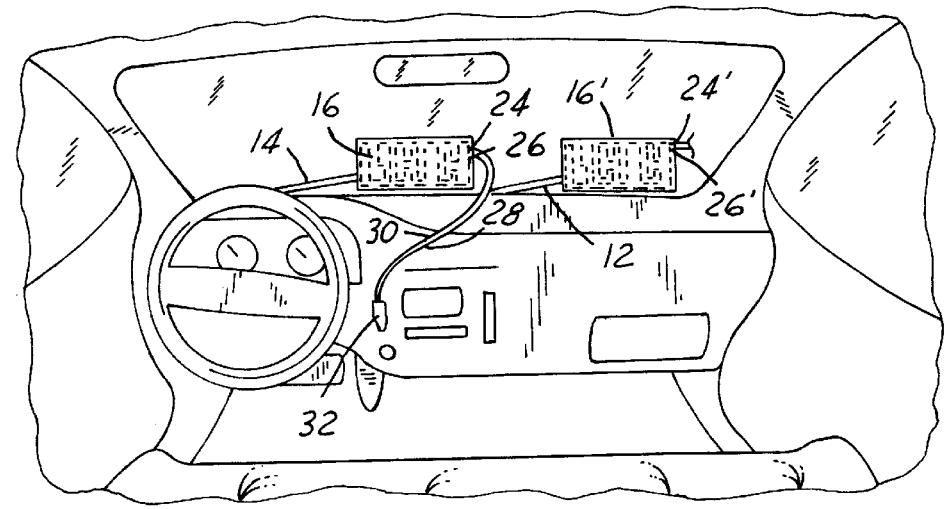
FIG. 3 is a perspective view showing the positioning of the windshield wiper heater of the present invention on a windshield.

As shown in FIG. 3, extending from the contacts 24 and 26 is means for transmitting electrical energy to the wire. The means for transmitting, generally, comprises a pair of electrical lead or conducting wires 28 and 30, respectively, each having a first end connected to an associated contact 24 and 26. Each conducting wire 28 and 30 has a second or opposite end (not shown) which terminates in a suitable plug or other means for connecting to a power source. Preferably, the second end of each lead wire is connected to a "plunger-type" plug 32 of the type well-known and commercially available. Such a plunger plug 32 is insertable into the lighter socket or outlet or a power accessory outlet of the vehicle. The plunger-type plug 32, generally, comprises a biased contact element which, when inserted in the lighter socket, closes a circuit to enable the wires 28 and 30 to conduct or to draw power from the vehicle battery through and into electrical communication with the resistance wire 20, via the contacts 24, 26.

The source of power, such as the vehicle battery, is essential to operating the heater. However, alternate power sources, such as a portable battery pack or the like may be used. Thus, other types of plugs may, also, be used in order to accommodate the power source. Also, other standard means for connecting the wires 28 and 30 to a source of power may be used, such as direct contact to a DC power source or the like.

Furthermore, a switch (not shown) may be interposed the plug and the contacts to enable intermittent operation of the heater without the need for removing the plug from the power source.

In a second or alternate embodiment hereof and as shown in FIG. 5, the heater 100 comprises: a) a first thin film 102 b) a heat generating conductive coating 104 deposited thereon, and c) a second film or film overlay 106. More particularly, the first thin film 102 is, preferably, a thermoplastic member formed from any suitable flexible synthetic material capable of having the conductive coating adhered thereto when deposited thereon. Suitable materials for the first thin film include the thermoplastic material sold commercially under the name MYLAR®. This film is preferred because of its physical properties i.e., it can be removably adhered to the windshield without the need for other adhesion promoter such as tape or the like and because of its receptivity to the conductive coating. However adjunct adherents may be used to secure the heater 16 to the windshield.

The conductive coating 104 which is used herein may be selected from any of the commercially available conductive inks or paints which can be stenciled or otherwise deposited onto the film. Typically, such inks comprise an aqueous-based conductive carbon black ink or pigment coating composition. Usually conductive pigments of the type contemplated for use herein ordinarily include conductive carbon black pigment. These pigments are well-known and commercially available compounds and are, generally, defined as dry conductive carbon black pigment. Other well-known conductive pigments which may be used herein include antimony-doped tin oxide, nickel, and graphite. Dispersions can be made of any of the pigments in monomers or oligomers or combinations thereof Herein, preferably, a mixture of conductive pigments is employed.

Other components that can be added to the conductive coating to induce or enhance conductivity include, additional conductive pigments other than those enumerated above and include metallic pigments such as gold, platinum, silver, titanium, aluminum, copper, and the like as well as mixtures thereof. These conductive metal pigments may be supported or unsupported. These metallic pigments come in forms such as flakes, powders, spheres, microballoons, microencapsulated, or other physical forms. Other additional conductive materials may be used conjointly with the carbon black. Such additional conductive materials that are contemplated use herein include encapsulated pigments; conductive polymers; conductive fibers (fibrols or fibrils); as well as mixtures thereof.

The coating 104 is applied by any suitable technique including spraying, roll coating, immersion, silk screening and the like.

The overlay 106 is bonded or otherwise deposited over the first film by any suitable technique and is used to sandwich the conductive coating or ink therebetween. Optimally, the material used for the overlay is the same as that used for the first film. Preferably, and as noted both the first film and overlay are formed from MYLAR.

Lead wires (not shown) can then be soldered or otherwise adhered to the conductive coating through either the overlay or first film by any suitable method known in the art. The wires then lead to the vehicle lighter socket or other power source as described hereinabove.

In use, the heater 16 or 100 is disposed on the windshield 10 within the passenger compartment and the power source is accessed via the plug to enable the transmission of electrical energy to the wire 20 or coating 104. The heater is disposed on the windshield proximate the rest or stationary position of the windshield wiper blades. Because of the heat generated by the wire 20 or coating 104, which approaches 40° F., by keeping the wiper blade in contact therewith for a sufficient period of time, any accumulation of ice or slush thereon is quickly melted away and the blades remain operational without the need for getting out of the car and cleaning them or otherwise removing the accumulated ice and/or slush therefrom.

It is apparent from the preceding that there has been described herein a heater for effectively removing ice from windshield wiper blades or the like through the use of an interiorly disposed heater element which can be removably affixed to the interior side of the windshield within the passenger compartment. It is to be readily apparent that many vehicles today have windshield wiper blades on the rear backlight and the present invention may be similarly applied thereto.

Having, thus, described the invention, what is claimed is:

1. A windshield wiper heater, comprising:
   (a) a laminate, comprising:
      (1) a first film;
      (2) an electrical resistance member having first and second contacts,
      (3) a second film, the resistance member being sandwiched between said first and second films, the contacts projecting exteriorly of the laminate;
      (4) said first film and said second film each being flexible films which are bonded to each other;
   (b) means for transmitting electrical energy to the resistance member through the contacts; and
   (c) a source of power, the means for transmitting being in electrical communication with the source of power.

2. The heater of claim 1, which further comprises:
an adhesive for securing the heater to a windshield of a vehicle.

3. The heater of claim 1 wherein:
the electrical resistance member comprises a copper wire.

4. The heater of claim 1 wherein:
the electrical resistance member comprises an electroconductive coating deposited on one of the films.

5. The heater of claim 4 wherein:
the first film comprises a flexible synthetic material capable of having the coating deposited and adhered thereonto.

6. The heater of claim 4 wherein the coating is either a conductive ink or a conducive paint.

7. The heater of claim 6 which further comprises:
a plug removably insertable into a power source disposed in the interior of a vehicle and in electrical communication with the conductive coating.

8. An automotive vehicle, comprising:
   (a) a windshield having a first surface exposed to the atmosphere, and a second surface facing a vehicle occupant;
   (b) a windshield wiper rotatably mounted onto and in contact with the first surface of the windshield, and
   (c) a heater disposed on the second surface proximate the windshield wiper, the heater comprising
      (1) a laminate comprising:
         (i) a first film;
         (ii) an electrical resistance member having first and second contacts,
         (iii) a second film, the resistance member being sandwiched between said first and second films, the contacts projecting exteriorly of the laminate;
         (iv) said first film and said second film each being flexible films which are bonded to each other;
      (2) means for transmitting electrical energy to the resistance member through the contacts; and
      (3) a source of power, the means for transmitting being in electrical communication with the source of power.

9. The automotive vehicle as described in claim 8 wherein said electrical resistance member comprises an electro conductive coating deposited on one of the films.

10. The automotive vehicle as described in claim 9 wherein said coating is either a conductive ink or a conductive paint.

11. A windshield wiper heater, comprising:
   (a) a laminate comprising:
      (1) a first film;
      (2) an electrical resistance member having first and second contacts,
      (3) said electrical resistance member comprising an electroconductive coating deposited on one of the films;
      (4) said first film comprising a flexible synthetic material capable of having the coating deposited and adhered thereonto;
      (5) a second film, the resistance member being sandwiched between said first and second films, the contacts projecting exteriorly of the laminate;
   (b) means for transmitting electrical energy to the resistance member through the contacts; and
   (c) a source of power, the means for transmitting being in electrical communication with the source of power.

12. A windshield wiper heater, comprising:
   (a) a laminate comprising:
      (1) a first film;
      (2) an electrical resistance member having first and second contacts,
      (3) said electrical resistance member comprising an electroconductive coating deposited on one of the films;
      (4) said coating comprising either a conductive ink or a conductive paint;
      (5) a second film, said electrical resistance member being sandwiched between said first and second films, said contacts projecting exteriorly of the laminate;
   (b) a plug removably insertable into a power source disposed in the interior of a vehicle and in electrical communication with the conductive coating;
   (c) means for transmitting electrical energy to the resistance member through the contacts; and
   (d) a source of power, the means for transmitting being in electrical communication with the source of power.

* * * * *